US008036442B2

(12) United States Patent
Bernard et al.

(10) Patent No.: US 8,036,442 B2
(45) Date of Patent: Oct. 11, 2011

(54) METHOD FOR THE PROCESSING OF RADIOLOGICAL IMAGES FOR A DETECTION OF RADIOLOGICAL SIGNS

(75) Inventors: Sylvain Bernard, Montigny le Bretonneux (FR); Serge Muller, Guyancourt (FR); Henri Souchay, Versailles (FR); Gero Peters, Paris (FR); Razvan Iordache, Paris (FR)

(73) Assignee: General Electric Company, Schenectady, NY (US)

( * ) Notice: Subject to any disclaimer, the term of this patent is extended or adjusted under 35 U.S.C. 154(b) by 1163 days.

(21) Appl. No.: 11/757,924

(22) Filed: Jun. 4, 2007

(65) Prior Publication Data
US 2007/0286336 A1 Dec. 13, 2007

(30) Foreign Application Priority Data

Jun. 7, 2006 (FR) ..................................... 06 52042

(51) Int. Cl.
*G06K 9/00* (2006.01)
(52) U.S. Cl. ........................ 382/132; 378/98.5
(58) Field of Classification Search .................. 382/128, 382/132, 270; 345/20; 378/98.5
See application file for complete search history.

(56) References Cited

U.S. PATENT DOCUMENTS

| 5,212,637 A * | 5/1993 | Saxena ..................... 364/413.26 |
| 6,310,967 B1 | 10/2001 | Heine et al. ................. 382/128 |
| 6,574,357 B2 * | 6/2003 | Wang ............................. 382/132 |
| 7,593,562 B2 * | 9/2009 | Harrington et al. ........... 382/141 |
| 2005/0152587 A1 * | 7/2005 | Sirohey et al. ................ 382/128 |

FOREIGN PATENT DOCUMENTS

| DE | 101 58 284 A1 | 12/2002 |
| FR | 2 847 698 A1 | 5/2004 |
| FR | 2 863 749 A1 | 6/2005 |

OTHER PUBLICATIONS

Thomas Netsch, Heinz-Otto Peitgen, "Scale-Space Signatures for the Detection of Clustered Microcalcifications in Digital Mammograms", IEEE Transactions on Medical Imaging, vol. 18, No. 9, Sep. 1999.

* cited by examiner

*Primary Examiner* — Andrew W Johns
(74) *Attorney, Agent, or Firm* — Global Patent Operation; Jonathan E. Thomas

(57) ABSTRACT

In a method for the processing of radiology images for detection of radiological signs, an algorithm is provided to detect such radiological signs on projections as a function of their contrasts. These contrasts are measured by using the responses of linear differential filters with different scale parameters. The method can be used to color or enhance the intensity of the radiological signs detected as a function of their degree of malignancy. The algorithm may be applied directly to the signal given by the detector.

13 Claims, 2 Drawing Sheets

METHOD FOR THE PROCESSING OF RADIOLOGICAL IMAGES FOR A DETECTION OF RADIOLOGICAL SIGNS

FIELD OF THE INVENTION

An embodiment of the present invention provides a method for the processing of radiology images for the detection of radiological signs. An embodiment of the present invention can be applied to special advantage but not exclusively in the field of medical imaging and, more particularly, that of mammography. The field of the present invention also relates to a medical image reviewing station comprising an image-processing method of this kind.

DESCRIPTION OF THE PRIOR ART

Today, mammography is widely used for the detection of lesions and the prevention of breast cancer. The signs to be detected in mammography images are radiological signs associated with lesions. These signs may be either calcium deposits or cases of opacity. Calcium deposits are called microcalcifications and individually form small-sized elements (ranging from 100 μm to 1 mm in diameter) that are more opaque to X-rays than the surrounding tissues. Opacities are dense regions where the X-rays are absorbed more intensely than in the adjacent regions.

Experience has now made it possible, to a certain extent, to distinguish between radiological signs that are more likely to be malignant, for example clusters of microcalcifications, and benign calcium deposits. There also exist means to interpret the shape and brightness of each individual microcalcification as well as the shape and extent of the clusters observed in radiography images, thus providing information on the malignant or benign aspect of that the radiological signs.

There also exist known ways of using image-processing methods by the radiologist can facilitate the detection of radiological signs. An example of such an image-processing method is described in the document U.S. Pat. No. 6,137,898.

The document U.S. Pat. No. 6,137,898 describes a system of computer-aided detection (CAD).

The detection system is used to read and analyze a preliminarily digitized radiography image film for the extraction, from this film, of suspect zones potentially corresponding to the presence of a lesion. This detection system gives localizing information on the lesions.

Once the film of the digitized radiography image is obtained, the detection system pre-processes the image to reduce the noise present. It has a Difference of Gaussian filter better known as a DoG. This Difference of Gaussian filter is applied to the pre-processed image. A locally adapted threshold is applied to each pixel of the filtered image in order to identify the potential calcium pixels of the radiography image. The center of gravity of each group of contiguous calcium pixels is then computed.

The detection system applies a clustering algorithm to identify the groups of contiguous pixels forming clusters of microcalcifications. It extracts eight attributes from each cluster, among them for example the length of the biggest axis, the length of the smallest axis and the density in microcalcifications. These extracted eight attributes are used by the detection system to eliminate false positives from the cluster of microcalcifications using a neural-network-based classifier.

The detection system performs a step to eliminate false positives formed by fibers. To do so, the detection system extracts regions of interest (ROI) surrounding each cluster. Each region of interest (ROI) is convoluted with a set of Gabor filters having different orientations. This is done to highlight the elongated structures in order to then eliminate them.

However, this image-processing method has drawbacks. In image-processing methods of this kind, the processing is done on digitized radiology films thus adding a digitized noise to the natural presence of the noise in the image to be processed. The increase in noise makes it more difficult to detect calcium pixels.

For mammography has a specific and particular feature which however can be found in other fields. This particular feature is related to the need to be able to analyze radiological signs that are clinically interesting between 100 μm and 1 mm. Since radiological signs are small objects on a heterogeneously textured background, the greater the noise level relative to the contrast of the radiological signs, the greater the risk of detection errors.

Furthermore, the use of Gabor filters augments the complexity of the algorithm of the image-processing method, similarly augmenting the time of computation and execution of said method. An image-processing method of this kind also calls for an optimization step based on a highly complex genetic algorithm. With this type of method, the requirements in terms of computation resources as well as memory resources are relatively great. The performance of such a method as well as its implementation calls for costly technologies owing to demanding specifications. This costly technology increases the total cost of a device comprising this method.

For present-day mammography devices, the frequency of use or the rate of medical acts is a vital and basic fact because this frequency comes into play in the economics of the apparatus. However, the implementation of prior-art image-processing methods in mammography cannot have a very high frequency of use without specialized equipment since the execution and computation times are relatively great.

Furthermore, these systems include algorithms based on characteristic parameters by which they can automatically distinguish malignant elements from benign elements. The drawback of these systems is that they tend to replace the radiologist in the interpretation of the image, especially as regards the distinction between malignant elements and benign elements. Now, these systems are not reliable enough to replace the radiologist entirely.

SUMMARY OF THE INVENTION

Embodiments of the invention are directed to overcoming the above-mentioned drawbacks of the prior art. To this end, an embodiment of the invention proposes an image-processing method for the detection of radiological signs on projections as a function of their contrasts. These contrasts are measured by using the responses of several scales of linear differential filters.

An embodiment of the invention proposes a novel approach to mammography that advantageously exploits the techniques of digital processing of the radiology image to improve the readability of the information. To this end, an embodiment of the invention produces a display of the projection in which certain radiological signs are enhanced or colored and/or, as an option, clusters of identified microcalcifications are marked and/or surrounded by a contour.

With this image-processing method, the radiological signs are easier to identify, thus enabling more efficient examination.

An embodiment of the present invention proposes an algorithm for the detection of radiological signs applied directly to the data given by the digital detector and not to digitized radiological films as in the prior art. This eliminates the noise introduced by the digitization method. An embodiment of the invention uses neither the DoG filters nor the Gabor filters of the prior art, thus eliminating the complexity of the algorithm introduced by these filters. An embodiment of the invention implements an algorithm for the computation of contrasts by means of linear differential filters for signal analysis. The use of these linear differential filters facilitates the algorithm and thus considerably reduces the computation time of the method of the invention. The linear differential filters are preferably Mexican hat type wavelet filters and, optionally, β-spline type wavelet filters.

An algorithm used by an embodiment of the invention is thus capable of accelerating the search for radiological signs while at the same time improving the visibility of the results. The algorithm can be used to indicate the position of the radiological signs by coloring or enhancing their intensity. It can also be used to enhance the radiological signs as a function of their degree of malignancy.

An embodiment of a method of the invention thus highlights all the radiological signs that appear in the image without distinction, whether these signs are grouped together or isolated, benign or malignant.

More specifically, a method for the processing of images from an X-ray device is provided, wherein:

from a radiographic projection of a body, a raw two-dimensional image of this body is produced, a presentation image is produced from the raw image, pixels presumed to be representative of radiological signs are localized in this raw image, the presumed radiological signs are displayed on the presentation image wherein:

at least one contrast is computed for each pixel of the raw image, a preliminary definition is made of at least one contrast threshold corresponding to radiological signs, when the computed contrast of each pixel is greater than the contrast threshold, then a radiological sign pixel attribute is assigned to the corresponding pixel, and the pixels provided with a radiological sign pixel attribute are displayed in the presentation image.

An embodiment of the invention also relates to a device for the implementing of said radiology image-processing method for a detection of radiological signs.

BRIEF DESCRIPTION OF THE DRAWINGS

Embodiments of the invention will be understood more clearly from the following description and the accompanying drawings. These drawings are given by way of an indication and in no way restrict the scope of the invention.

DETAILED DESCRIPTION OF EMBODIMENT OF THE INVENTION

Figure 1:
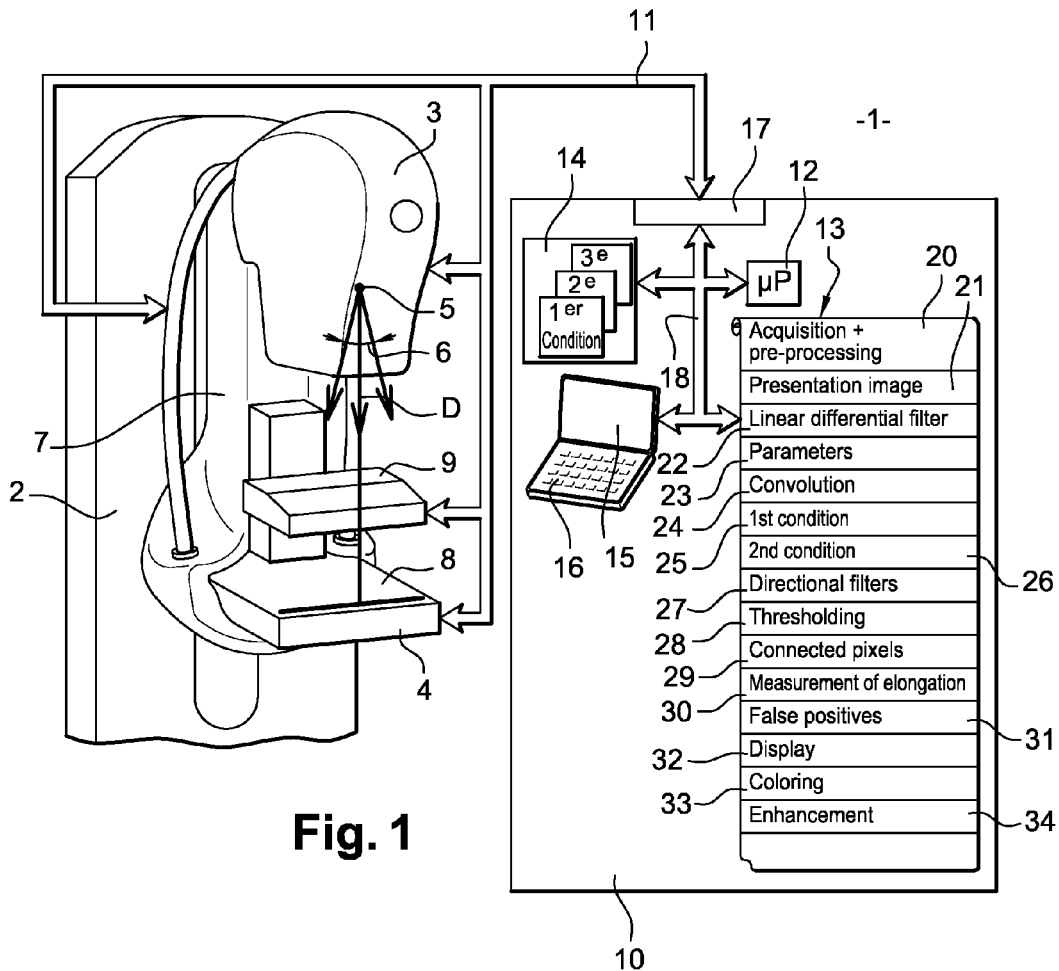
FIG. 1 is a schematic view of an X-ray device, especially a mammography machine, provided with the improved means of the invention.

FIG. 1 shows an X-ray device, especially a mammography machine, configured according to an embodiment of the invention. This X-ray device 1 has a vertical column 2. On this vertical column, there is a hinged arm 7 bearing an X-ray-emitting tube 3 and a detector 4 capable of detecting the X-rays emitted by the tube 3. This arm 7 may be oriented vertically, horizontally or obliquely. The tube 3 is provided with a focus 5 which is the X-ray emitting focus. This focus 5 emits an X-ray beam 6 along the direction of emission D.

At present there are several types of mammography projection images which have standardized terminology. For mammography screening, generally a cranio-caudal and an oblique medio-lateral projection are performed on each breast. In certain situations, additional tests or examinations may be made, in particular an echography and/or a biopsy. The arm 7 shifts the tube 3 to predefined positions to obtain a cranio-caudal and/or oblique medio-lateral projection for each breast.

In a preferred example, the detector 4 is a digital detector. The detector 4 is hooked to the arm 7 opposite the tube 3 and in the direction of emission D, so as to receive the X-ray beam 6.

The arm 7 is provided with a breast-holder tray 8 on which a patient lays her breast. This breast-holder tray 8 is placed on top of the detector 4. The detector 4 is placed beneath the breast-holder tray 8. The detector 4 detects the X-rays that have crossed the patient's breast and the breast-holder tray 8.

Furthermore, for reasons related both to the immobilizing of the breast and to image quality or intensity of X-rays delivered to the patient's breast, it is necessary to compress the patient's breast during the radiography. Various compression forces may be applied. These forces are applied through a compression pad 9 which compresses the breast on the breast-holder tray 8 as a function of the type of examination to be made. To this end, the arm 7 has a pad 9 that is a sliding pad capable of being made to compress the breast either manually or in being motor-driven. The pad 9 is made out of an X-ray transparent material, for example plastic. The arm 7 therefore bears the following vertically: starting from the top, the X-ray tube 3, the compression pad 9, the breast-holder tray 8 and the detector 4.

While the pad 9, the patient's breast, the tray 8 and the detector 4 are fixed, the X-ray tube 3 may take up various positions in space relative to this assembly.

In one variant, the detector 4 may be mobile and may take up various positions around the breast at the same time as the X-ray tube 3. In this case, the detector 4 is no longer fixedly joined to the breast-holder tray 8. The detector 4 may be flat or curved. It may be shifted rotationally and/or in translation.

After having received the beam 6 which crosses a part of the patient's body, the detector 3 emits electrical signals corresponding to the energy of the rays received. The electrical signals may then be transmitted to a control logic unit 10 by means of an external bus 11. The signals may then be transmitted to a control logic unit 10 by means an external bus 11. These electrical signals enable this control logic unit 10 to produce a 2D raw image corresponding to the part of the body X-rayed.

In a preferred embodiment, the coloring or the enhancing of the intensity of the elements liable to constitute the radiological signs is done on an image known as a presentation image that can be viewed by the radiologist, distinct from the raw image but obtained from it.

This presentation image can be displayed by means of a screen of this control logic unit 10 or it may be printed.

In one example, the control logic unit 10 comprises a microprocessor 12, a program memory 13, a data memory 14, a display screen 15 provided with a keyboard 16 and an output/input interface 17. The microprocessor 12, the program memory 13, the data memory 14, the display screen 15 provided with a keyboard 16 and the input/output interface 17 are interconnected by an internal bus 18.

In practice, when a device is said to have performed an action, this action is performed by a microprocessor of the device controlled by instruction codes recorded in a program memory of the device. The control logic unit 10 is such a device. The control logic unit 10 is often made in integrated-circuit form.

The program memory 13 is divided into several zones, each zone corresponding to instruction codes in order to fulfill a function of the device. Depending on variants of the invention, the memory 13 has a zone 20 comprising instruction codes to set up a predefined position of the tube and command an emission of X-rays at this position. The instruction codes of this zone 20 produce an image from the signal given directly by the detector. The zone 20 also has instruction codes to carry out a pre-processing on this image in order to correct artifacts due to the acquisition geometry and to the detector, thus producing an image known as a raw image.

The memory 13 has a zone 21 comprising instruction codes for the production, from the raw image, of an image known as a presentation image on which elements that could be radiological signs will be enhanced or colored after having been detected on the raw image.

This presentation image is obtained by another processing method from the raw image. An example of a processing method of this kind is described in the document FR 28 47 698. The document FR 28 47 698 describes a method of management of the dynamics of a digital radiology image. This method is used to adapt the variations of the gray levels in order to display an image whose appearance enables reading on the entire span of the patient's breast, including in the dense zones.

The memory 13 comprises a zone 22 comprising instruction codes to determine a linear differential filter to be applied to the raw image. The memory 13 has a zone 23 comprising instruction codes to determine the number and the values of the scale parameter of the linear differential filter that can be used to cover the range of possible sizes of radiological signals.

The memory 13 comprises a zone 24 comprising instruction codes to perform a convolution of the linear differential filter with the raw image in order to compute, for each pixel, a contrast that characterizes it. This convolution is done for each value of the scale of the linear differential filter. The memory 13 comprises a zone 25 comprising instruction codes to verify that the contrast computed for each pixel complies with a first predefined contrast threshold condition. This first predefined contrast threshold condition depends on the intensity of the background and on the scale parameter of the filter. This zone 25 assigns a radiological sign pixel attribute to each pixel of the raw image. It assigns a non-radiological-sign pixel attribute to all the other pixels that do not comply with this first condition.

A radiological sign pixel attribute or non-radiological-sign pixel attribute is a temporary and internal parameter of the control logic unit. In one example, the attribute may be a graphic annotation or a binary number.

The memory 13 has a zone 26 comprising instruction codes to verify that the contrast computed for each pixel having a radiological sign attribute complies with a second predefined contrast threshold condition. This second predefined contrast threshold condition depends on the noise level. This zone 26 eliminates all the pixels whose contrast does not respect this radiological sign pixel attribute from the raw image. To do so, the zone 26 changes the radiological sign pixel attribute into a non-radiological-sign pixel attribute for all the pixels that not do not comply with the second contrast threshold condition.

The memory 13 has a zone 27 comprising instruction codes to implement an application of directional filters to the raw image in order to augment the contrast of the elongated structures of the raw image. The memory 13 comprises a zone 28 comprising instruction codes to perform a thresholding operation dependent on the level of local noise on the image processed by the directional filters or else on the image processed by the linear differential filters in order to determine the potential fiber pixels. The memory 13 has a zone 29 comprising instruction codes to determine the sets of connected potential fiber pixels.

The memory 13 has a zone 30 comprising instruction codes to measure the elongation of each set of connected pixels. The memory 13 has a zone 31 comprising instruction codes to compare the measurement of the elongation of each set of connected pixels with a predefined threshold in order to eliminate false positives formed by fibers. To carry out this elimination when the elongation of the set of connected pixels is greater than the predefined threshold, the zone 31 assigns the non-radiological-sign pixel attribute to each pixel of the set of connected pixels.

The memory 13 has a zone 32 comprising instruction codes to apply a display algorithm in the presentation image. This display algorithm may apply instruction codes of the zone 33 and/or instruction codes of the zone 34. The memory 13 has a zone 33 comprising instruction codes to assign a piece of color information to each pixel having a radiological sign pixel attribute. The memory 13 has a zone 34 comprising instruction codes to enhance the signal of the pixels having a radiological sign pixel attribute in the presentation image.

In an embodiment of the invention, the detection of the radiological sign pixels is done in the raw image and the enhancing of the intensity or the coloring of the detected pixels is done preferably in the presentation image.

The control logic unit 10 carries out the acquisition of a radiography projection of the body. The breast and therefore the detector are thus irradiated during this acquisition. The control logic unit produces a raw image of this projection. From this raw image, it also produces a presentation image. It is from this raw image that the processing method is used to localize pixels liable to constitute radiological signs. These presumed radiological signs may be microcalcifications or cases of opacity. The radiological signs are enhanced or colored in the presentation image.

For each pixel of the raw image, the control logic unit computes a contrast that characterizes it.

The pixel contrast computation means are formed by a linear differential filter designed to react strongly in the presence of structures having a given dimension and shape. To implement the contrast computation means, the control logic unit applies a binary mask to the raw image in order to separate the breast tissue from the background. Consequently, the raw image is converted into a contrast image defined for each pixel of the breast.

Figure 2A:
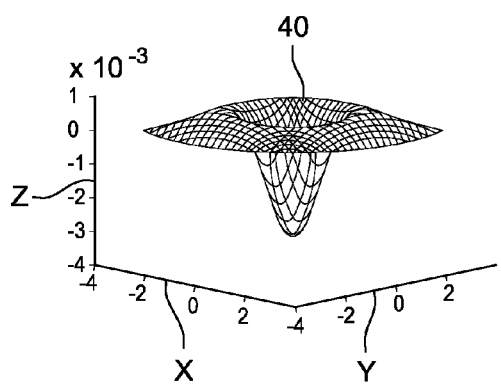
FIG. 2a is a schematic view of a Mexican-hat type wavelet filter according to the invention.
Figure 2B:
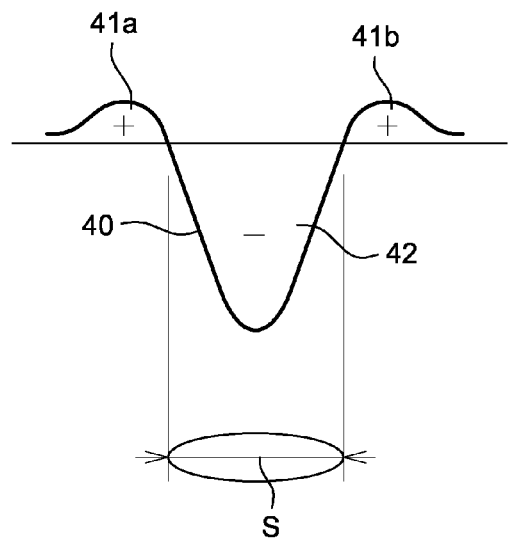
FIG. 2b is a schematic view of a section in the plane (X, Z) of the wavelet filter of FIG. 2a, according to the invention.

In a preferred embodiment, the linear differential filter with a scale parameters is a wavelet filter, it being known that this wavelet filter described in FIGS. 2a and 2b may be replaced by other types of linear differential filters used to compute a contrast on all the pixels of the raw image. FIG. 2a shows a 3D schematic view of the wavelet filter with the scale parameter s. Wavelet filtering is a method used to analyze the content of the raw image.

In a preferred embodiment, the wavelet filtering is of an inverted Mexican hat type. The scale parameter of the wavelet filter is very similar to the notion of scale for geographical maps. As in the case of the maps, the big scale values correspond to non-detailed overall views. The low scale values correspond to detailed views. In terms of frequency, similarly, the low frequencies or big scales give overall information on the signal usually throughout the extent of the signal whereas the high frequencies or low scales give detailed information on the smaller patterns in the signal.

The wavelet filter is represented, in the example of FIG. 2, on the X, Y and Z Cartesian coordinates. The wavelet filter is translated to the plane defined by the X and Y axes. The Z axis represents the amplitude of the wavelet filter.

Wavelet filtering is particularly well suited to local and multiple-scale analysis in medical imaging, especially mammography. The control logic unit defines a family of wavelet filters to be applied to the raw image in order to compute the contrast for each predefined size of radiological sign. The logic control unit arbitrarily chooses the scale depending on the predefined size of radiological sign. Thus, the scale parameter of the filter depends on the sign of the radiological signal sought.

This wavelet filtering enables the selection of the pixels presenting a level of intensity greater than a constant multiplied by the scale s of the filter multiplied by the intensity of the background. This makes it possible to keep only the pixels having sufficient intensity in the raw image.

In the invention, to compute the contrast of each pixel for all the predefined sizes of radiological signs, the control logic unit defines the number and the values of the scale parameter s.

In a preferred embodiment, the control logic unit defines two scale parameters and the value of each scale parameter. These values are determined as a function of the range of radiological signs to be detected. In one example, the control logic unit seeks to detect the radiological signs belonging to the range sized 100 µm to 500 µm because, beyond this value, the radiological signs are sufficiently visible to the radiologist. In this case, since the resolution of the detector is 100 µm, the range of the sizes is covered with two scale parameter values. The value of the first scale parameter s=s1 is equal to $\sqrt{2}$ and the value of the second scale parameter s=s2 is equal to 2. In one variant, the number and the values of the scale parameter may be different from those mentioned here above. This number and these values of the scale parameter defining the family of the wavelet filters may be changed as a function of the sizes of the radiological signs to be detected.

FIG. 2b shows a section view in the plane (X, Z) of the wavelet figure of FIG. 2a according to the scale s1 or s2. Each wavelet filter defined by the control logic unit measures the contrast of each pixel of the raw image, as a function of the scale parameter s1 or s2. The wavelet filter 40 is a local filter. It has a central part formed by negative coefficients and a positive part located on the periphery. The greatest radius of the negative part is equal to the value of the scale of the filter.

The equation of the wavelet filter is given in polar coordinates by the following equation where r is the radius variable:

$$f_s(r) = -\left(1 - \frac{r^2}{s^2}\right) \cdot e^{-\frac{r^2}{s^2}}$$

where s is the scale of the filter, s being equal to s1 or s2. The control logic unit performs a convolution of the raw image with a first wavelet filter having a scale s=s1 and then a second wavelet filter with a scale s=s2, in order to extract the pixels whose contrast, for at least one of the scales, is greater than a constant multiplied by the scale s multiplied by the intensity of the background. This approach with several graduations makes it possible to adapt to the variations planned in the size of the radiological signs, in medical imagery.

During the convolution of the raw image with the wavelet, the control logic unit computes, at each pixel having coordinates (x, y) of the raw image, a mean of the gray levels neighboring (x, y) weighted by the absolute value of the negative coefficients of the filter and a mean of the gray levels neighboring (x, y) weighted by the positive coefficients of the filter. The mean of the gray levels present in the negative part represents the mean of the gray levels of the part presumed to be a radiological sign part. The means of the gray levels present in the positive part represents the mean of the gray levels of the presumed background part surrounding the presumed radiological sign.

Finally, the control logic unit computes the contrast of said pixel in taking the difference between these two average values. The use of the wavelet filter enables a computation of linear contrast in taking a difference between the mean values of gray level. This type of computation of contrast is more robust relative to noise than a difference between a gray level value at the pixel (x, y) and the signal of a neighboring pixel. Furthermore, with this type of computation of the contrast, it is possible to foresee the impact of the wavelet filters on the noise level.

The theoretical contrast $\Delta I$ of a spherical radiological sign with a radius s, measured by the wavelet at the center of the sphere in the raw image is $\Delta I = I_b \cdot s \cdot \Delta\mu \cdot K$ where K is a constant, Ib is the background intensity and $\Delta\mu$ is the difference between the coefficients of attenuation of the composition of the breast tissue and of the composition of the radiological sign. The background intensity $I_b$ is measured in the raw image as the mean of the gray levels neighboring the pixel (x, y) weighted by the coefficients present in the positive part of the wavelet coefficients and s is also the scale parameter of the wavelet filter.

$\Delta\mu$ depends on the composition of the breast, the composition of the radiological sign and the X-ray energy. It is difficult to predict $\Delta\mu$ since the composition of the breast and the exact composition of the radiological sign are unknown. Consequently, the control logic unit sets a lower boundary $\Delta\mu_{min}$ for the radiological signs. This lower limit will be matched according to a simulation of the algorithm.

Figure 3:
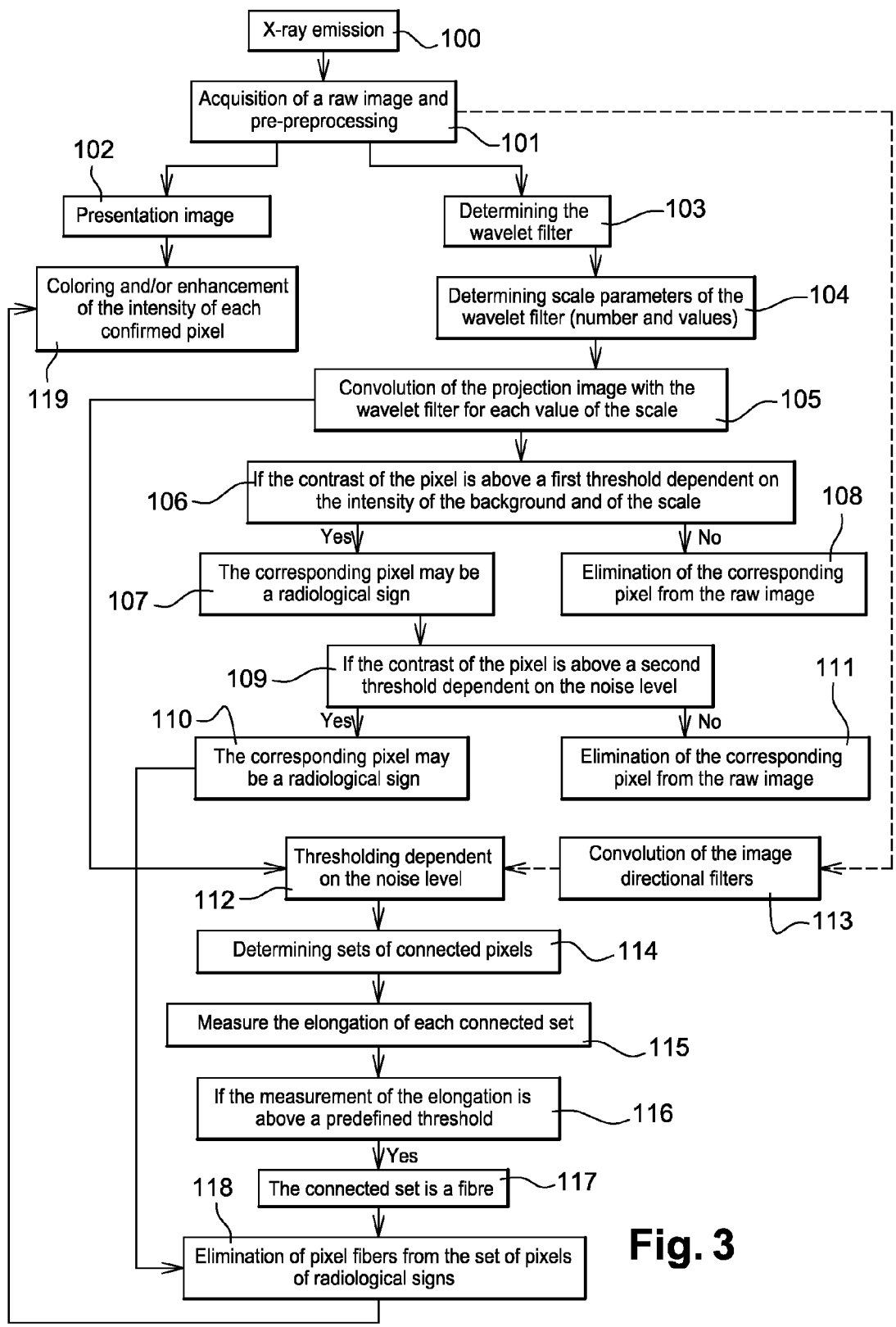
FIG. 3 illustrates means implementing the method of the invention.

After the contrast has been computed, the control logic unit determines the pixels meeting the predefined radiological sign contrast threshold conditions as described in FIG. 3.

FIG. 3 shows an illustration of means implementing the method of the invention. In FIG. 3, the X-ray tube, in the step 100, emits X-radiation intensities going through the patient's breast for a projection, according to a previously determined reference position.

At the step 101, the detector acquires a raw image of X-rays representing the prediction 4. This raw image is pre-processed by the control logic unit in order to eliminate artifacts due to the acquisition geometry and the detector.

At the step 102, the control logic unit produces a presentation image from the raw image.

At the step 103, the control logic unit determines a wavelet filter to be applied to the raw image. This wavelet filter is preferably an inverted Mexican hat type wavelet filter.

At the step 104, the control logic unit determines the number of scales to be applied to the raw image as well as the values of these scales. The number and values of the scales must be sufficient to cover the range of the sizes of the radiological signs. In the example of the invention, the control logic determines two scales having values s=$\sqrt{2}$ and s=2.

At the step 105, the control logic unit performs a convolution of the raw image with the wavelet filter for each scale determined at the step 104. This step enables the computation of the contrast of each pixel of the raw image, as described in FIG. 2b.

At the steps 106 to 111, the control logic ascertains that the measured contrast of each pixel in the image is sufficient to be considered as a radiological sign pixel, depending on the size of the radiological sign, the intensity of the background and the noise level. If the contrast is not greater than an attenuation of a radiological sign having a radius s or if the probability that this contrast comes from the noise is too great, then the pixel is not considered to be a radiological sign pixel.

At the step 106, the control logic unit compares the contrast of each pixel with a first pre-determined condition of radiological sign contrast threshold.

The control logic assigns a radiological sign pixel attribute only to the pixels whose contrast meets this first contrast threshold condition.

First condition: the contrast $\Delta I > I_b \cdot s \cdot \alpha$.

If the measured contrast is greater than a contrast α multiplied by the background intensity $I_b$ and by the scale parameter s of the filter, then the control logic unit applies the step 107. If not, it applies the step 108. The background intensity $I_b$ is given at every point by the convolution of the raw image with the coefficients of the positive parts of the wavelet filter.

At the step 107, the control logic unit assumes that the corresponding pixel is like a potential radiological sign pixel in assigning it the radiological sign pixel attribute.

At the step 108, the control logic unit eliminates the corresponding pixel from the raw image in assigning it the non-radiological-sign pixel attribute.

However, this first contrast threshold condition is not selective enough, especially in the case of a low noise contrast ratio. This low noise contrast ratio often results in low X-ray intensities during the acquisition of the raw image. In this case, the probability that the measured contrast comes from the noise is high. As a consequence, the control logic defines a second contrast threshold condition at the step 109.

This second contrast threshold condition is defined as follows: the contrast of each pixel selected at the step 107 must also be greater than a constant β multiplied by the mean standard deviation of the noise. A preferred embodiment takes account only of the quantum noise σ which is linearly related to the square root of the background intensity.

Thus, the second contrast threshold condition rejects the candidate pixels whose contrast might come from the quantum noise. This rejection is done with a rejection rate controlled by the parameter β.

The second contrast threshold condition to be met is that: the measured contrast $\Delta I > \beta \cdot \sigma$ with $$\sigma = \sqrt{I_b} \cdot \sqrt{\iint_{x,y} f_s(x, y)^2 dx dy}$$

o where the $f_s(x, y)$ are the coefficients of the wavelet filter.

However, it can be seen that, in reality, the quantum noise is also altered by a modulation transfer function (MTF) of the detector. This modulation transfer function is preferably known beforehand. In one variant, it can be computed according to prior art computation modes. Thus, to improve the second contrast threshold condition, the control logic unit can incorporate measurements of modulation transfer function in the algorithm of the invention. Furthermore, in addition to the quantum noise, there is the electronic noise of the detector.

When the contrast of the candidate pixels is greater than the second contrast threshold condition which is a constant multiplied by the square root of the background intensity and by the square root of the sum squared of the coefficients of the filter, then the control logic unit applies the step 110. If not, it applies the step 111.

At the step 110, the control logic unit keeps the radiological sign pixel attribute of the corresponding pixel.

At the step 111, the control logic unit assigns the non-radiological-sign pixel attribute to said corresponding pixel of the raw image. Said corresponding pixel is considered to be noise.

Finally, a pixel is chosen as being the radiological sign pixel if, for one of the two scales $s=\sqrt{2}$ or/and $s=2$, the measured contrast of this pixel complies with the two predefined contrast threshold conditions. These two contrast threshold conditions made be combined in a single third contrast threshold condition. In this case, the combination of the first and second contrast threshold conditions is expressed as follows: the measured contrast $\Delta I > \max(I_b \cdot s \cdot \alpha, \beta \cdot \sigma)$ where α and β are the parameters of the algorithm.

However, structures of the raw image may have characteristics similar to the characteristics of radiological signs. To eliminate these structures forming false positives in the raw image, the control logic unit applies firstly an adequate linear filter to said raw image. These linear filters are determined as a function of a given radiological sign characteristic. These characteristics may be for example size and shape. In one example, these linear filters enable the structures of a given size to be reinforced. Furthermore, the control logic unit applies a set of morphological, densitometry and/or textural criteria to said structures in order to differentiate them from the radiological signs.

In one example of the invention, the structures are illustrated by fibers, it being known that they can also be illustrated by any other type of structure that does not constitute a radiological sign. In the raw image, some fibers may have good properties of attenuation and a diameter similar to that of the radiological signs. This leads to a large number of false positives formed by the fibers in the raw image. Here, therefore, shape is the most important characteristics used to distinguish the radiological signs from the fibers because the fibers have a highly elongated shape unlike the radiological signs.

To do this, the control logic unit can eliminate the majority of the false positives formed by the fibers in using the coefficients of the Mexican hat type wavelets described here above. This leads to an algorithm that is fast but less selective than an algorithm using the directional filters.

At the step 112, the control logic unit performs a thresholding operation, dependent on the local noise level, on the image filtered by the Mexican hat type wavelets in order to determine the pixels of potential fibers. This filtered image is given by the step 105. The control logic unit selects the pixels of potential fibers of the filtered image if, for one of the two scales considered: $s=\sqrt{2}$ and $s=2$ the contrast of the pixel is greater than a predefined fiber threshold. This fiber threshold is equal to $\beta_{fibre} \cdot \sigma$ where $\beta_{fiber}$ is a parameter of the algorithm.

In one variant, the control logic can determine the filtered image by executing the step 113. At the step 113, the control logic unit applies directional filters to the raw image of the step 101 to augment the signal of the fibers. In a preferred embodiment, the directional filters are β-spline wavelet type functions. These functions are described in the document FR28 63 749. These wavelet filters have different scales and orientations. For each pixel, the control logic unit determines the wavelet filter that gives the best response. The best filter gives the orientation of the fiber in the neighborhood of the pixel as well as the directional filtered image. A threshold is then applied to the directional filtered image in order to determine the pixels of potential fibers. For a pixel(i,j) of the image, this threshold is equal to $\beta_{fibre} \cdot \sigma'$ with $$\sigma' = \sqrt{M(i,j)} \cdot \sqrt{\iint_{x,y} g_{max}(x,y)^2 dx dy}$$

where $M(i,j)$ is the average of the gray level in the neighborhood of the point (i,j). $g_{max}(x,y)$ are coefficients of the β-spline wavelet locally giving the best response.

The directional filtered image obtained reinforces the signal of the fibers with greater discernment because it makes use of the elongated structure of the fibers unlike the isotropic Mexican hat type fibers. The tradeoff is far greater computation time.

At the step 114, the control logic unit creates a binary image in which all the pixels are placed at 0 except the pixels of potential fibers which are placed at 1. To extract the pixels of fibers from among the pixels placed at 1, the control logic unit applies a connected-component algorithm that extracts particles formed by a set of connected points set at 1.

At the step 115, the control logic unit determines the morphology of each connected set of pixels forming particles. A major shape characteristic may be given by the greatest Feret number that provides information on the length of the particles. The Feret numbers measure the elongation of the particle along a set of directions sampling the totality of the possible directions.

At the step 116, the control logic unit determines a Feret threshold $I_{Feret}$. This threshold $I_{Feret}$ is preferably obtained by simulation. When the elongation of the particle measured is greater than the threshold $I_{Feret}$, then the control logic unit applies the step 117.

Thus, an algorithm used in an embodiment of the invention has four parameters $\alpha$, $\beta$, $\beta_{fiber}$ and $I_{Feret}$ which are determined by simulation on a truth database.

At the step 117, the control logic unit considers the particles detected at the step 116 to be fibers and, in a step 118, the non-radiological-sign pixel attribute is assigned to their pixels.

At the step 119, the control logic unit applies an algorithm for displaying the radiological sign pixels to the presentation image in order to facilitate the practitioner's analysis. This display algorithm may assign a piece of color information to each pixel of the presentation image having a radiological sign pixel attribute as well as to the immediate environment of these pixels.

The display algorithm may also apply a process of enhancing the intensity of the pixels having a radiological sign pixel attribute.

The enhancement process consists of the application of a connected-component algorithm to a binary image consisting of a set of pixels at 1 for positions of radiological sign and 0 elsewhere. This leads to a set of radiological sign particles. Then, for each pixel of the presentation image belonging to a particle and its immediate environment, the intensity of the pixel is increased relative to the intensity of the immediate environment of the particle.

The immediate environment of a particle is defined as a set of pixels located at a distance smaller than a distance D from the pixels of the particle. This distance is a preliminarily defined parameter. The control logic unit computes the mean of the gray level $M_p$ in the immediate environment of the particle. This mean of the gray level $M_p$ is the background intensity of the particle. For each pixel (i,j) of the particle and its immediate environment, the enhanced image referenced DCA(i,j) is obtained by amplifying the difference between the intensity S(i,j) of the pixel of the particle and the background intensity $M_p$ of the particle according to the following equation:

$$DCA(i,j) = M_P + \left(1 + A \cdot e^{-\frac{d^2}{\tau^2}}\right) \cdot [S(i,j) - M_P]$$

where A directly influences the enhancing power and d is the distance between the pixel (i,j) and the particle with d=0 for each pixel inside the particle. Since it is difficult to identify radiological sign sections, the control logic applies an enhancement whose strength diminishes with distance from the particle. The parameter $\tau$ controls this reduction of the enhancement factor with distance.

It is also possible optionally to integrate clinical information into the enhancement process by using an enhancement factor that depends on this information.

In one example, the control logic unit integrates a piece of cluster-type clinical information into the enhancement process. The clusters of microcalcifications are obtained by a microcalcification clustering algorithm. The enhancement of each pixel belonging to the particle as well as to its immediate environment defined earlier is given by the following equation:

$$DCA(i,j) = M_P + C \cdot \left(1 + A \cdot e^{-\frac{d^2}{\tau^2}}\right) \cdot [S(i,j) - M_P]$$

where C depends on the number of microcalcifications in the cluster.

In one example, the clusters are indicated on the presentation image by markers created by the logic control unit. These markers may be a graphic annotations located at the center of gravity of the clusters.

In one variant, the logic control unit can plot a contour around the clusters having more than a given minimum number of microcalcifications. This may be of interest if the practitioner's attention needs to be directed specifically to the calcium content.

Should the display of the results be done by coloring the voxels of radiological signs, a color is assigned to them as a function of the quantity $S(i,j)-M_p$, the distance d and optionally the number of microcalcifications in the cluster as well as the cluster number.

The final presentation image on which the particles of radiological signs have been enhanced or colored is displayed on the display screen in order to be viewed by a practitioner. In this final image, all the radiological signs have been highlighted without distinction as regards their character of being suspect or as regards their grouped or isolated character. Consequently, the radiologist obtains an immediate overall view of the mapping of the distribution of radiological signs.

In general, the control logic unit may consider a model of radiological sign with different shapes and noises different from the quantum noise. Thus, the control logic unit may use different assumptions as inputs for different types of processing.

What is claimed is:

1. A method for the processing of images from an X-ray device, the method comprising:
   accessing raw image data;
   localizing pixels presumed to be representative of radiological signs in the raw data;
   computing at least one contrast for each pixel of the raw data;
   making a preliminary definition of at least one contrast threshold corresponding to radiological signs; and,
   when the computed contrast of each pixel is greater than the contrast threshold, assigning a radiological sign pixel attribute to the corresponding pixel.

2. A method according to claim 1, further comprising:
   identifying a set of pixels of structures forming false positives in which the pixels have characteristics close to radiological signals; and
   assigning at least one of the pixels of the structures a non-radiological-sign pixel attribute as a function of morphological, densitometry and/or textual criteria.

3. A method according to claim 2, further comprising elimination of structures forming false positives comprises the following steps:
   determining directional filters to be applied to the raw data in order to amplify the contrast of the structures, in which the response of the linear differential filters is considered;
   defining a structural contrast threshold which depends on the local noise level;
   creating a binary image data in which all the pixels whose filtered image is greater than the structure contrast threshold are at 1 and all the others are at 0;
   determining particles formed by a set of connected pixels;
   measuring the elongation of each particle;
   defining a minimum threshold of elongation; and,
   when the elongation of the particle is greater than the minimum elongation threshold, assigning the pixels of the particle a non-radiological-sign pixel attribute.

4. A method according to claim 3, wherein the directional filters are β-spline type wavelet filters having different scales and orientations.

5. A method according to claim 1, wherein the computation of the contrast of each pixel comprises the following steps:
   determining a linear differential filter having a scale parameter to be applied to the raw data;
   the scale parameter being characterized by the size of radiological signs to be analyzed,
   determining a sufficient number of scale parameters to cover a range of sizes of the radiological signs,
   performing a convolution of the raw image with each linear differential filter, for each scale value.

6. A method according to claim 5, wherein the linear differential filter is a Mexican-hat type of wavelet filter comprising a central part formed by negative coefficients and a positive part located at the periphery, the greatest radius of the negative part being equal to the value of the scale of the filter.

7. A method according to claim 1, wherein the preliminary definition of at least one contrast threshold comprises the following steps:
   preliminarily defining a first threshold that depends on the local background intensity in the raw image and the value of the scale of the filter;
   providing this background intensity at every point by the convolution of the raw image with tile coefficients of the positive part of the wavelet filter;
   preliminarily defining a second threshold that depends on a local noise level present in the raw data; and
   combining the first and second threshold in order to obtain the contrast threshold.

8. An x-ray device comprising an x-ray tube, an x-ray detector and a control logic unit, wherein raw data is generated by x-rays emitted from the x-ray tube that reach the x-ray detector, and wherein the control logic unit is configured to perform the image processing method of claim 1.

9. A method according to claim 1, further comprising:
   generating an image from the raw data;
   displaying the presumed radiological signs on the generated image; and
   displaying the pixels provided with a radiological sign pixel attribute in the generated image.

10. A method according to claim 9 further comprising:
    assigning color information to at least one of the pixels having a radiological sign pixel attribute, as well as to their immediate environment, in the image, or
    enhancing the intensity of the pixels having a radiological sign pixel attribute, as well as their that of immediate environment, in the image; and
    displaying the image with at least one of the pixels colored or enhanced.

11. A method according to claim 10, wherein enhancing the intensity of the pixels comprises the following steps:
    creating binary image data in which all the pixels having a radiological sign pixel attribute are at 1 and all the others are at 0;
    determining particles formed by a set of connected pixels; and
    amplifying the difference between the intensity of each pixel of the particle, as well as its immediate environment, and the mean intensity of the pixels surrounding the particle.

12. A method according to claim 11, further comprising:
    determining the cluster of particles comprising a minimum number of particles,
    amplifying as a function of the number of particles present in the cluster the difference between the intensity of each pixel of the particle, as well as its immediate environment, and the mean intensity of the pixels surrounding the particle; and one of
    placing a marker in the vicinity of the center of gravity of the cluster and plotting a contour demarcating the cluster.

13. A method according to claim 1, wherein the raw image data is two-dimensional.

* * * * *